United States Patent [19]

Olson et al.

[11] Patent Number: 4,581,734
[45] Date of Patent: Apr. 8, 1986

[54] MULTIPRIORITY COMMUNICATION SYSTEM

[75] Inventors: Gene H. Olson, Minneapolis; Dennis A. Quy, Apple Valley, both of Minn.

[73] Assignee: Rosemount Inc., Eden Paririe, Minn.

[21] Appl. No.: 580,070

[22] Filed: Feb. 14, 1984

[51] Int. Cl.$^4$ .................................................. H04J 3/02
[52] U.S. Cl. .......................................... 370/85; 370/94; 340/825.5
[58] Field of Search .............................. 370/85, 94, 89; 340/825.5, 825.51

[56] References Cited

U.S. PATENT DOCUMENTS

| | | | |
|---|---|---|---|
| 4,168,400 | 9/1979 | de Couasnon et al. | 370/89 |
| 4,359,731 | 11/1982 | Beauford et al. | 370/85 |
| 4,451,881 | 5/1984 | Grice et al. | 370/85 |
| 4,491,946 | 1/1985 | Kryskow, Jr. et al. | 370/89 |

Primary Examiner—Douglas W. Olms
Assistant Examiner—Kenneth I. Rokoff
Attorney, Agent, or Firm—Kinney & Lange

[57] ABSTRACT

A data communication system allocates use of a common data communication medium shared by a plurality of stations. During each transmission cycle, the communication medium carries data packets of varying priority which each station receives. The stations are allocated use of the communication medium during one or more priority intervals as a function of the priority of the packet which the station is ready to transmit. Each station is synchronized to a transmission cycle period which is divided into subperiods. Certain types of packets are relegated to transmission and reception within predetermined subperiods.

22 Claims, 5 Drawing Figures

MULTIPRIORITY COMMUNICATION SYSTEM

REFERENCE TO COPENDING APPLICATIONS

Reference is hereby made to the following copending applications filed on even date herewith and assigned to the same assignee and which are incorporated by reference: "Communication System with Slot Time Error Detection", Ser. No. 580,007; "Communication System with Subdivided Transmission Cycles", Ser. No. 580,006; and "Alternating Communication Channel Switchover System", Ser. No. 580,112.

BACKGROUND OF THE INVENTION

1. Field of the Invention

The present invention relates to allocation of a common communication medium by a plurality of stations, and particularly to allocation as a function of the type and priority of the messages to be communicated.

2. Description of the Prior Art

Common data communication media capable of carrying communication between a plurality of stations typically take forms such as coaxial cables, optical fibers, radio frequency channels and microwave channels. Typically, the stations comprise components of a distributed data processing or process control system such as microprocessors, controllers, loggers, visual displays, etc. Some stations are active in the sense that they transmit and receive communications. Other stations are passive in that they only receive communication.

To ensure accurate communications and minimal conflict, various protocols have been implemented in the past. One type of protocol simply uses one designated station or a central controller to determine which station will transmit its data packet and when. This approach, however, is subject to failure when the designated station or central controller malfunctions or its connection to the communication medium is impaired.

In another type of protocol labelled "token pass", each station interactively passes control of the communication medium to another station by passing a "token". The token is usually part of a data packet and indentifies the station which is to receive the token and hence control the communication medium. Problems with the token pass protocol occur if the token is lost, or if two tokens somehow are generated, or if some stations never receive the token. With any of the above problems, communication is momentarily disrupted, and relatively complex recovery techniques must be invoked to restore communication.

Numerous other protocols exist for allocating use of a communication medium without a central controller. In broadcast recognition access method (BRAM) protocols, each transmitted packet identifies its station of origin. Each receiving station sets a transmit timeout based on the difference between its local address and the source address of the last packet. The station with the shortest timeout has the first opportunity to transmit. Other stations receive that transmission, and suspend their own transmission until the transmission is complete. The source address of the last transmission now is used to compute the timeout for each station.

In other protocols, such as carrier sense multiple access (CSMA) protocols, each station generates a random time delay for initiation of transmission following the end of the last transmission. Collisions are detected and the messages are retransmitted. A station will not initiate a transmission so long as activity is detected on the communication medium.

The above schemes make no provision for differing message priorities. Hence, low priority messages may tie up the communication medium, delaying transmission of higher priority messages, especially where all stations are capable of transmitting both high and low priority messages. This is of extreme concern in distributed process control systems which typically control critical chemical, manufacturing or other industrial processes.

SUMMARY OF THE INVENTION

In the communication system of the present invention, the use of a common communication medium is allocated based upon priorities of the packets to be transmitted. In this way, highest priority packets always take precedence within the system over those packets of lower priority. In this way, no one station can monopolize the communication medium while one or more other stations have higher priority packets to transmit.

In the present invention, each packet type which can be transmitted over the communication medium is assigned to one of a plurality of priority levels. Each priority level has a communication medium access protocol consistent with the packet type assigned to the level. The preferred access protocol provides a different set of time slots which are spaced in time from the end of the last packet Each station of the system includes detection means coupled to the communication medium for detecting activity on the communication medium. A Detect signal from the detection means indicates the beginning and the end of each packet being transmitted on the communication medium.

The station inludes transmitter means coupled to the communication medium for transmitting a packet in response to a Transmit Enable signal. The packet to be transmitted is selected by packet selecting means and is provided to the transmitter means, which awaits the Transmit Enable signal.

Slot time selecting means selects the time slot for transmission of the selected packet to be transmitted as a function of the priority of that packet. Timer means responsive to the Detect signal provides the Transmit Enable signal to the transmitter means if the selected time slot occurs before the Detect signal indicates the beginning of a new packet being transmitted on the communication medium.

If the selected time slot is reached and the Transmit Enable signal is provided, the transmitter means transmits the selected packet to be transmitted onto the communication medium. If, on the other hand, a new packet is transmitted before the selected time slot occurs, this indicates that a different station within the system has taken control of the communication medium. When that station completes its transmission and its packet ends, the process of selecting a packet to be transmitted, selecting a slot time based upon the priority of that packet, and timing the period from the end of the last packet is repeated.

The system of the present invention is highly advantageous, in that it permits different priority levels to use different access protocols in assigning time slots within the particular set of time slots which correspond to that priority level. For example, in one preferred embodiment of the present invention one of the priority levels uses a dedicated time slot, while another priority level uses a rotation queue protocol such as BRAM to assign time slots within the set corresponding to that priority level.

DETAILED DESCRIPTION OF THE PREFERRED EMBODIMENTS

Figure 1:
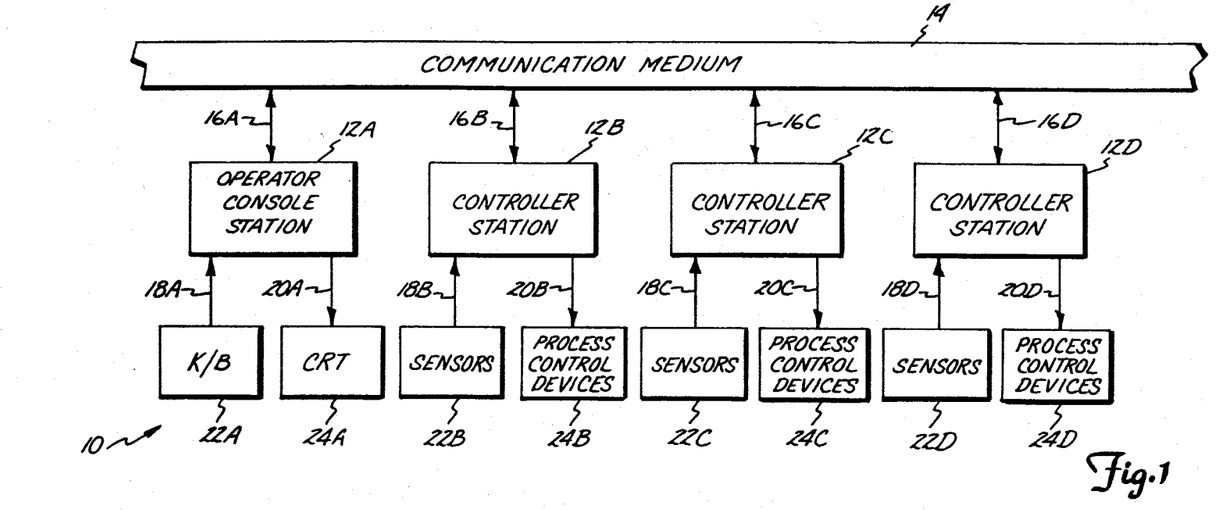
FIG. 1 is an electrical block diagram of a data communication system of the present invention.

In FIG. 1, a data communication system 10 includes a plurality of stations 12A-12D coupled to a common communication medium 14 by lines 16A-16D, respectively. For the purposes of this description, system 10 will be described and discussed as a distributed process control system, and stations 12A-12D as stations in that process control system. It will be recognized, however, that in other embodiments system 10 is a data processing system, an office automation system, a voice communication system, or the like, and stations 12A-12D are devices in that particular type of system.

Communication medium 14 preferably comprises a twin axial cable, optical wave guide, or radio or microwave frequency communication medium for carrying signals such as packets of data among stations 12A-12D. In a preferred embodiment, these data packets are in the form of serial data.

Stations 12A-12D are stations in a distributed process control system such as microprocessor based controllers, data loggers, and operator input/output consoles. Each station 12A-12D typically receives inputs through lines 18A-18D and provides outputs through 20A-20D, respectively. The particular types of inputs and outputs, and the numbers of inputs and outputs provided depend, of course, upon the particular nature of each station. For the following discussion, it will be assumed that station 12A is an operator input/output console, and that stations 12B-12D are each individual microprocessor based process controllers.

Operator console station 12A receives inputs through line 18A from keyboard 22A and provides outputs through line 20A to cathode ray tube (CRT) monitor 24A. Controller stations 12B-12D receive input signals on lines 18B-18D from sensors 22B-22D, respectively. The inputs from sensors 22B-22D represent process variables which are used by controllers 12B-12D in controlling a particular process. The outputs of controller stations 12B-12D are in the form of process control signl which are supplied through lines 20B-20D to process control devices 24B-24D, respectively.

In a typical embodiment of system 10, process variables sensed by sensors 22B-22D include temperature, pressure, and other well known process variables. Process control devices 24B-24D take various forms, including valves, motors, and other devices which can be actuated by process control signals. Each controller station 12B-12D typically controls several individual process control devices, and receives inputs from several different sensors. The process control signals supplied by a particular controller station (for example station 12B) are typically a function of several process variables. In a distributed process control system, some of the process variables may initially be received as inputs at another station (for example, controller stations 12C or 12D). The data communication system 10 provides communication among the various stations 12A-12D, so that process variables and other information and data needed to provide outputs at the various stations can be communicated rapidly, efficiently, and with minimum likelihood of error.

In one preferred embodiment of the present invention, system 10 operates on a transmission cycle that is of a predetermined length (for example 0.25 seconds). During each transmission cycle, every station 12A-12D is granted access to communication medium 14 for transmission of specific types of data packets as a function of time remaining in the cycle. Other types of data packets are accommodated as they occur independent of the transmission cycle.

System 10 uses a variable message length format that allows an individual station 12A-12D to transmit over communication medium 14 for only as long as is necessary to complete its transmission. Other stations can access communication medium 14 with minimum delay, thus reducing the amount of idle time for the entire system and increasing the overall efficiency of system 10.

Figure 2:
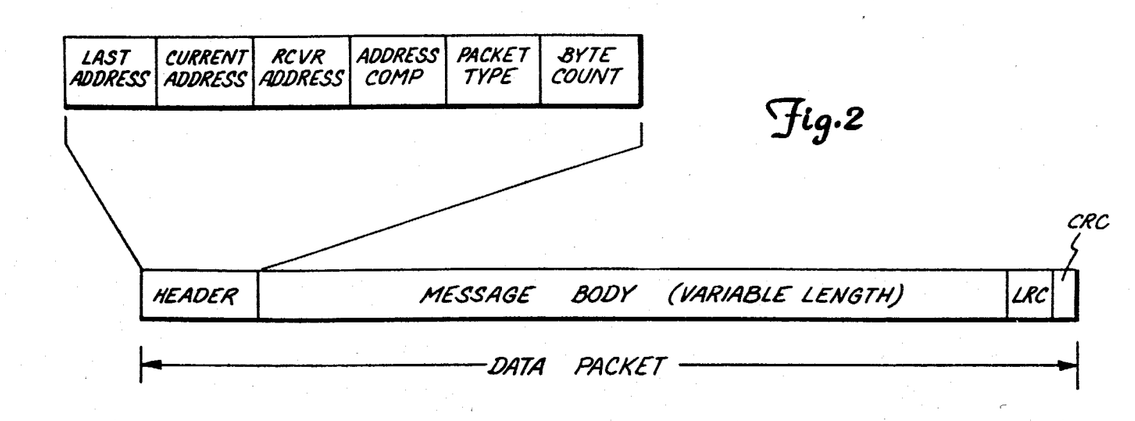
FIG. 2 is a diagram illustrating the contents of data packets of the system of FIG. 1.

FIG. 2 shows a preferred configuration used by most data packets, regardless of type in system 10. As shown in FIG. 2, all packets include a header, a message body, and two redundancy checks.

The header section contains common information needed for packet communication within system 10. As shown in FIG. 2, the header includes the address of the last station that transmitted successfully ("Last Address"), the address of the station currently transmitting ("Current Address"), the destination of the packet if it is a point-to-point type of packet ("Receiver (or Destination) Address"), the complement of the address data ("Address Complement"), a "Packet Type", and a "Byte Count". The Address Complement is a check used to validate the "Last Address" portion of the header. The length of each data packet can and will vary substantially depending upon the type of packet. The Byte Count provides an indication of the total length of the packet in bytes and provides further verification to the receiving station that the data packet has been correctly received. In a preferred embodiment, the header measures only eight bytes in length.

The message body of the data packet has a variable length. In the preferred embodiment, the message body can contain up to one kilobyte of data.

At the end of each data packet is a 32 bit longitudinal redundancy check (LRC) and a 16 bit cyclical redundancy check (CRC). These redundancy checks ensure the validity of the data contained in the packet, and signal the end of the transmission to the receiving station.

Several individual messages can be sent in this same data packet as part of the message body. Each packet provides four independent data checks—an address check, a packet length check, an LRC check, and a hardware CRC check—to ensure data integrity. This data structure is not only highly reliable, but it is also very efficient. On a highly loaded communication medium 14, up to 90% of the communication capacity is available for process data, while as little as 10% is required for overhead.

In one successful implementation of the system of the present invention, a redundant bus structure of the type described in the previously mentioned copending application entitled "Alternating Communication Channel Switchover System" is used. In order to achieve the automatic and alternating switchover between the two busses based upon quality assessments of bus condition by each station and the frequency of previous traffic on each bus, each data packet includes a data field which selects the bus to be used by all of the stations 12A–12D during the transmission of the next data packet. In the following description, it will be assumed that the message body of each data packet includes a bus or channel selection field, although that field is not necessary for operation of the present invention.

Three different classes of data packets are used in system 10 of the present invention: "Broadcast", "Point-to-Point", and "Idle". Broadcast type data packets are sent to all stations, and require no explicit packet acknowledgement. Point-to-Point type data packets are directed to a specific desination address and require an answering data packet. Idle type data packets absorb substantially all idle capacity to keep system 10 in an active state at all times.

Broadcast type packets do not have a specific destination address, and do not require an acknowledgement. The different Broadcast type packets include: a Time Interval Control (TIC) packet that synchronizes time within system 10, a LINK Broadcast packet that consists of preconfigured transfers of process data; a LINK Request (LNRQ) packet that requests a retransmission of a lost link message; a LINK Reply packet, that replies to a LNRQ packet by retransmitting the pre-configured process data; and a REJECT packet that responds to an LNRQ packet which is received in the wrong part of the transmission cycle.

As described previously, system 10 operates on a predetermined transmission cycle having, for example a 0.25 second period. The purpose of the TIC packet is to provide a timing signal which synchronizes the clocks in all stations 12A–12D. One specific station from among stations 12A–12D is always responsible for generating the TIC packet. While any one of the stations 12A–12D can assume responsibility for the TIC packet, the specific station having responsibility is selected depending upon the configuration of system 10. In a preferred embodiment, at least one of the stations 12A–12D has a high accuracy real time clock, and, under normal conditions, it is this particular station which is preferably selected for providing the TIC packet. The TIC packet does not control communications on communication medium 14. Instead, the TIC packet merely synchronizes the clocks of all of the stations 12A–12D. If the particular station responsible for transitting the TIC packet fails, system 10 continues to operate normally until another station automatically assumes responsibility for producing the TIC packet.

The message body of the TIC packet includes a current time data field (which indicates the current real time in seconds since a predetermined date); a current override margin data field (which indicates the current manually selected proportion of traffic for each of the channels of communication medium 14); and data validity check fields.

LINK Broadcast packets provide preconfigured communications among stations 12A–12D. They carry process information, calculations, intermediate results, and outputs from one of the stations to one or more of the other stations in system 10. Each station 12A–12D preferably schedules one LINK Broadcast packet for transmission during each transmission cycle.

The message body of the LINK Broadcast packet includes process control data value fields, bus quality assessment fields (which are used to share opinions of quality of the channels) and an override margin field.

Each station 12A–12D maintains both a Link Send table and a Link Receive table within its memory storage. The Link Send table contains a list of preconfigured data that the station is to transmit; the Link Receive table contains a list of preconfigured data the device is to receive.

At the start of a transmission cycle, each station 12A–12D examines the tables to determine what data should be broadcast in the LINK Broadcast packet, and assembles this data into a transmit buffer. When its turn comes to transmit, each station 12A–12D transmits the link broadcast packet.

The sending station does not know where the data contained in the LINK Broadcast packet is needed. It simply knows that the data is needed elsewhere in system 10 and that is should transmit that data. An acknowledgement is not reqired. The responsibility for receiving the LINK Broadcast packet is left to the receiving stations. This reduces the number of acknowledgement messages which otherwise would be required.

Each station 12A–12D receives the data from the LINK Broadcast packet in a receive buffer and then reviews its own Link Receive table to determine if the data from the sending station is needed. Data items listed in the receiving station's Link Receive table is used to update data within the station's memory; data which is not needed is ignored.

This procedure continues for every station until all stations 12A–12D in system 10 have transmitted a LINK Broadcast packet. As will be described in further detail later, all LINK Broadcast packets should be sent by 60% through the transmission cycle.

If the 60% point in a transmission cycle is reached and a station (for example, station 12D) has not received a LINK Broadcast packet from one of the other stations (for example, station 12A), the station 12D which has not received the LINK Broadcast packet will transmit the LNRQ packet on its next turn to transmit. In response to the LNRQ packet, the identified station (in this example station 12A) is expected to reply with the very next packet, or the reply is considered lost. This protocol provides reliability of a request/reply communication technique without the overhead usually involved with acknowledged messages. It also provides an automatic check and update on all Link Send tables every transmission cycle.

In response to a LNRQ packet, the station (in this example station 12A) whose LINK Broadcast packet was not received by another station (in this example station 12D) has two possible responses: a LINK Reply packet or a REJECT packet. The LINK Reply packet is transmitted in response to an LNRQ packet when the LNRQ packet is received more than 20% after the start of the transmission cycle. The LINK Reply packet contains the same data as a LINK Broadcast packet, but is transmitted only in response to an LNRQ packet.

The REJECT packet is transmitted in response to an LNRQ packet which has been received less than 20% of the cycle after the cycle started. The reject packet informs the station which sent the LNRQ packet that the link data being sought is currently unavailable.

Point-to-Point type packets are used for all nonconfigured communications. The Brodcast type packets discussed above have preconfigured send and receive tables for all communications. However, communications that occur randomly—alarms, operator changes, trend data requests, operator displays, and requests for reporting data—cannot be preconfigured, and therefore require a different type of handling within system 10.

Three major differences distinguish Point-to-Point and Broadcast type packets. First, Point-to-Point type packets have only one receiving station. Second, Point-to-Point type packets require an acknowledgement and usually data in return. Third, Point-to-Point type packets are not synchronized to the transmission cycle, thus allowing for several different occurrences of Point to Point packets between the same two stations within a transmission cycle.

System 10 has three different Point to Point type packets: Point-Point (PTPT) packets; Point-Point acknowledge (ACK) packets; and Point-Point busy (BUSY) packets.

The PTPT packet is used for all regular point to point traffic among stations 12A-12D. The PTPT packet contains both source and destination identification, sequencing information, and application message data. The receiving station must reply to a PTPT packet in the very next packet with either an ACK or BUSY packet or the transmission is considered lost.

The ACK packet is the normal response to a PTPT packet when the PTPT packet has been correctly received and stored in a receive buffer of the intended receiving station.

The BUSY packet is sent in response to a PTPT packet when the receiving station has correctly received the PTPT packet, but currently has no receive buffer available. On receipt of the BUSY packet, the PTPT originating station schedules the PTPT packet for retransmission later when it is again its turn to transmit.

An example will illustrate how each of the Point-to-Point type packets operates in system 10. Each of the three Point-to-Point packets is described in this example.

Assume an operator wishes to send a change to controller station 12C. The operator enters data through keyboard 22A into operator console station 12A. This causes operator console station 12A to place the message in its transmit buffer and wait for its turn to transmit a PTPT packet. When its turn comes, operator console station 12A transmits the PTPT packet over communication medium 14 to controller station 12C. If the packet is correctly received, controller station 12C then responds with either an ACK packet or a BUSY packet. If the response is a BUSY packet, or no packet is received when expected, operator console station 12A will continue to transmit periodically until its PTPT packet is acknowledged by controller station 12C sending an ACK packet.

After sending an ACK packet, controller station 12C on its next turn automatically transmits a PTPT packet to console station 12A as a reply. If the original PTPT packet from console station 12A was a request for data, the PTPT packet sent in reply includes the data requested. If the original PTPT packet was a configuration change, controller station 12C transmits a PTPT packet containing the resulting value from that configuration change for verification by console station 12A. Because controller station 12C replies in the form of a PTPT packet, operator console station 12A acknowledges the PTPT packet from controller station 12C with an ACK packet, and then displays the receive data through CRT monitor 24A.

The final packet type is the IDLE packet type. The IDLE packet is similar to the Broadcast type packets, except that it does not contain data. Each station 12A-12D queues an IDLE packet for transmission when no higher priority packet (i.e. any other packet type) is ready to be sent.

IDLE packets are used to maintain time synchronization of system 10 between TIC packets. In addition, the IDLE packets help system 10 to compile statistics about performance of communication medium 14 which are used in the automatic alternating channel switchover feature described in the previously mentioned copending application.

System 10 of the present invention does not require a separate central controller to determine the access to communication medium 14 by the various stations 12A-12D. Instead, system 10 uses a timing technique involving a variable delay time after the end of the previous message before each station 12A-12D is permitted access communication medium 14. When communication medium 14 is idle, each station looks at the types of packets it has to transmit. Priority is assigned to packets using different time delays. Each packet type has a different range of delay times or "time slots". The shorter the delay time, the higher the priority. In other words, stations with high priority packets wait only a short time before transmitting; devices with lower priority packets wait a longer time before transmitting. This ensures that high priority packets have access to communication medium 14 before those of lower priority. If a station has both high and low priority packets, the highest priority packet is sent, and the station relinquishs control of communication medium 14 to other stations with high priority packets before sending its low priority packet.

In the preferred embodiment of the present invention, there are five priority levels to which packets are assigned:

Priority One—ACK, BUSY, REJECT, and LINK Reply packets.
Priority Two—TIC packets.
Priority Three—LINK Broadcast and LNRQ packets.
Priority Four—PTPT packets.
Priority Five—IDLE packets.

At any given time, there is only one station that can have a Priority One packet, and only one station that can have a Priority Two packet. However, many stations can have lower priority packets (i.e. Priority Three, Four, or Five) at the same time. When several stations have packets of the same priority, access to communication medium 14 is controlled based upon a predetermined access rotation.

Figure 3:
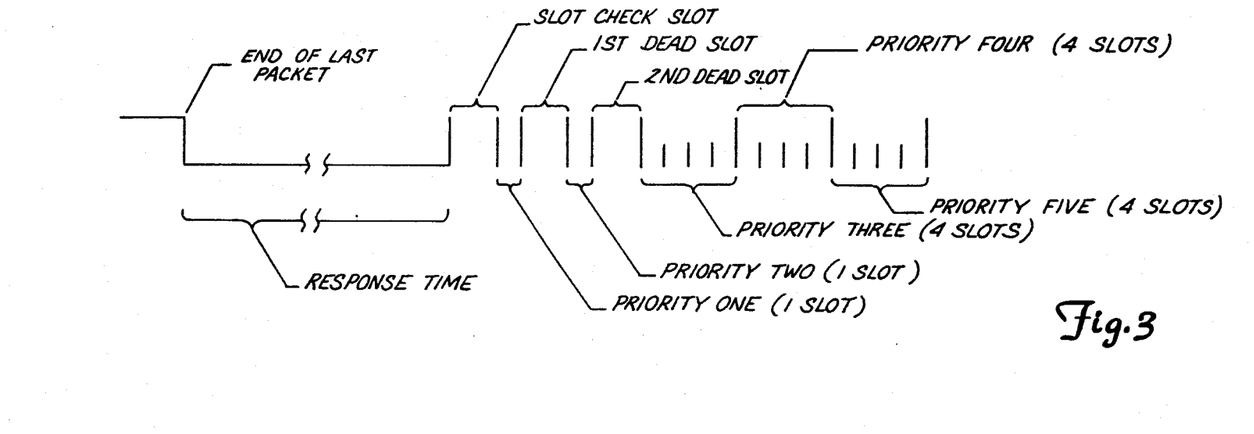
FIG. 3 is a timing diagram illustrating time slots allocated for packets of different priority in the system of FIG. 1.

FIG. 3 illustrates the allocation of time delays or time slots for the varying priorities. As shown in FIG. 3, after the end of the previous packet, there is a "Response Time" or "set up time" period during which each station is acting upon the previous packet. None of the time slots for transmission fall within this Response Time. In one preferred embodiment of the present invention, the Response Time period is about 700 microseconds.

Before the first regular time slot, a 10 microsecond "slot check" time slot is reserved to assist with slot time error checking which will be described in further detail later.

The first regular time out slot is the Priority One slot reserved for ACK, BUSY, REJECT, and LINK reply packets. Only one station is able to transmit such a packet at any given time, so a single 10 microsecond time slot is sufficient.

The next time slot is a first Dead slot. This slot of 10 microsecond duration provides extra separation and thus tolerance between the Priority One slot and the Priority Two slot.

The Priority Two slot follows the first Dead slot and is reserved for TIC packets. The Priority Two slot is used for all TIC packets once a single station is established to serve the TIC packet generation function. When several stations are contending for the TIC function, the Priority Three slots described below are used instead. The Priority Two slot is, once again, a single 10 microsecond slot, since only one station transmits the TIC packet once that station has been established as the TIC packet generator.

Following the Priority Two slot is a second Dead slot of 10 microsecond duration. Once again, the purpose of the second Dead slot is to provide extra tolerance.

The Priority Three slots follow the second Dead slot. There are as many Priority Three slots as there are stations in system 10. In the particular example shown in FIG. 1, four stations 12A-12D are shown, and in that case there are Four Priority Three slots of 10 microsecond duration each. The Priority Three slots are reserved for LINK, BROADCAST AND LNRQ packets.

The Priority Four slots are reserved for PTPT packets. One slot is reserved for each station (i.e. in the present example there are four Priority Four slots of 10 microsecond duration each, one for each station 12A-12D).

The final time slots are Priority Five slots, which are reserved for IDLE packets. Once again, one slot of 10 microsecond duration is provided for each station 12A-12D of system 10.

At the end of each transmission of a packet, each station 12A-12D initiates a first timer which times the response time, and then assembles the packets which it has to transmit. Each station 12A-12D selects the packet of highest priority from among the packets which it has to transmit, and selects its particular time slot based upon the priority of that packet and that station's position in the transmission rotation. A second timer is loaded to provide a delay time which will end when the particular station's time slot is reached. If no other station has transmitted prior to reaching that station's time slot, it will begin transmission of its packet. In this way, a Priority One packet is always transmitted before a Priority Two packet; a Priority Two packet is always transmitted before a Priority Three packet; and so on.

In the case of both the priority one time slot and the priority two time slot, there is only one station which will have a Priority One packet and only one station which will have a Priority Two packet at any given time. In the case of Priority Three, Four, and Five packets, however, several stations are likely to have packets of the same priority. In a preferred embodiment of the present invention, the order of time slot allocation among the stations 12A-12D for each of the Priority Three, Priority Four and Priority Five time slots is rotated with each transmission, so that each station 12A-12D will have an equal chance to transmit packets of this type during the transmission cycle. One particularly advantageous technique for rotating the time slot allocations within the Priority Three, Priority Four and Priority Five time slots is the Broadcast Recognition Access Method (BRAM).

With the BRAM allocation of time slots for Priorities Three, Four and Five, each station 12A-12D is assigned a position in a rotation queue. The position assigned to each station 12A-12D within the rotation queue changes everytime a transmission occurs. The station at the front of the queue transmits its packet, and then is placed at the back of the queue with all other stations advancing one time slot. This ensures that each station 12A-12D has first access to communication medium 14 on a periodic basis.

The assignment of the slots within Priorities Three, Four and Five is according to the following rules. Once a station (for example station 12A) has finished transmitting a priority three packet (for example a LINK Broadcast packet) it is assigned the last slot within Priorities Three, Four and Five. All other stations then adjust their time slot within each priority level according to the BRAM protocol. Thus in this example station 12B would move up to have the first time slot within Priorities Three, Four and Five. Assuming that there are no other Priority One or Priority Two messages and station 12B has a priority three message, it will reach its time slot before any other station transmits, and therefore will transmit its LINK Broadcast packet. Once that transmission is complete, station 12B will be assumed the last time slot within Priorities Three, Four and Five, and each of the other stations will move up by one time slot so that station 12C is then at the front of the rotation queue in Priorities Three, Four and Five.

If a station at the front of the rotation queue has no Priority Three packet to transmit, its time slot at the beginning of the rotation queue expires without a packet being sent. The next station in the rotation queue then reaches its time slot and then begins to transmit if it has a packet within Priority Three.

This process continues until there are no stations with Priority Three packets to transmit. Therefore, the Priority Four time slots will be reached, and the process is repeated until all Priority Four packets have been sent. Finally, if no other packets are available to be sent, the Priority Five time slots are reached after each transmission, and the station with the first priority five time slot transmits an IDLE packet.

In one preferred embodiment of the present invention, in which a much larger number of stations are used, each station is permitted to move PTPT packets from Priority Four to Priority Three whenever none of the last few packets have been Priority Three packets. This allows the PTPT packets to move forward into the Priority Three time slots, thus reducing transmission time delay. The Priority Four time slots remain, but are unused. When any station sends a normal Priority Three packet (i.e. a LINK Broadcast or an LNRQ packet), the PTPT packets are moved back to Priority Four time slots.

It should be noted that many protocols other than BRAM can be modified to use the priority scheme of the present invention. These protocols include CSMA, persistent CSMA, CSMA/CD (for example Ethernet) or fixed priority time out (for example Hyper-channel). With the present invention, different protocols can be used to set different orders for transmission by the various stations for each of the different priority levels. For example, one priority level can assign the order of transmission based upon BRAM, while another priority level uses CSMA/CD to determine the order of transmission by the stations.

Figure 4:
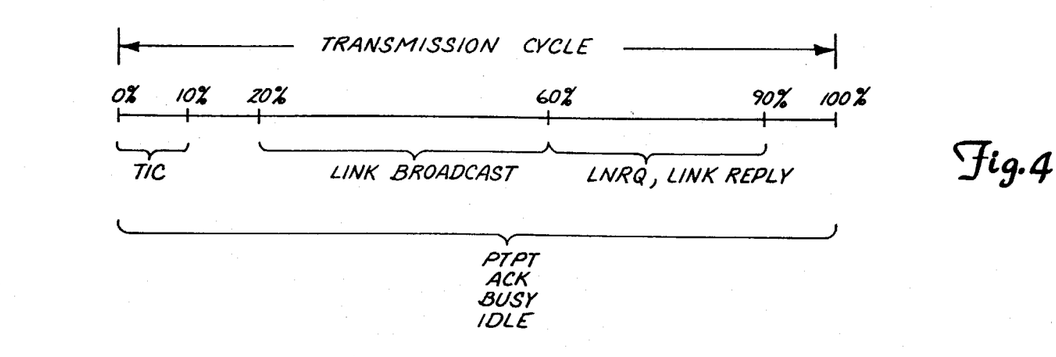
FIG. 4 is a diagram illustrating the transmission cycle used in the system of FIG. 1.

FIG. 4 illustrates the structure of the transmission cycle used in system 10. As shown in FIG. 4, each transmission cycle is divided into five subperiods. The first subperiod begins at zero percent (0%) and continues to 10% of the total cycle. The second subperiod begins at 10% and continues to 20%. The third subperiod begins at 20% and continues to 60% of the cycle. The fourth subperiod begins at 60% and continues to 90% of the transmission cycle; and the fifth and final subperiod begins at 90% and continues to the end of the transmission cycle.

Because each station 12A-12D has an internal clock, each station 12A-12D knows when a new transmission cycle begins. When the station's clock shows that a new cycle is beginning, the station 12A-12D begins gathering any link data it needs to send during that transmission cycle, and listens for the TIC packet.

The TIC packet confirms the start of the transmission cycle and synchronizes all stations 12A-12D of system 10. The TIC packet occurs during the first subperiod.

During the third subperiod, transmission of LINK Broadcast packets is enabled. Each station 12A-12D is required to transmit a LINK Broadcast packet during the third subperiod.

If a station has not received a LINK Broadcast packet from one of the other stations of system 10 by the beginning of the fourth subperiod, it transmits an LNRQ packet asking that the missing LINK Broadcast packet be retransmitted. The response to the LNRQ packet is a LINK Reply packet, which is a Priority One packet. By the end of the fourth subperiod, all LNRQ packets and LINK Reply packets should be completed.

PTPT, ACK, BUSY, and IDLE packets can occur at any point in the transmission cycle. The ACK and BUSY packets have Priority One, and thus will occur in response to a PTPT packet at any time within the transmission cycle.

The PTPT and IDLE packets have Priority Four and Priority Five, respectively. These packets will only occur if there are no higher priority packets waiting to be sent.

During the second subperiod, LINK packets can be received. Transmission of LINK packets, however, is not enabled prior to the third subperiod. Any LINK packet received during the second subperiod indicates that one of the stations is slightly out of synchronization with the other stations as to the beginning of the transmission cycle.

The transmission cycle described in FIG. 4 is very efficient because it is not monopolized by packet acknowledgements. Instead, the responsibilty is placed on the receiving station for ensuring reception of LINK Broadcast packets. If each of the stations 12A-12D has received the LINK Broadcast packet from each of the other stations, there is no need to confirm reception. In this manner, if all of the stations have received the LINK Broadcast packet, there is no contention among stations to send an acknowledgement. If some stations have failed to receive a LINK Broadcast packet from another station, each of those stations prepares an LNRQ packet for transmission in the fourth subperiod. At the beginning of the fourth subperiod, the LNRQ packets begin to be transmitted. Because the LNRQ packets are broadcast, only one station needs to send an LNRQ packet to satisfy all other stations which did not receive the LINK packet. Upon receiving the LNRQ or its corresponding LINK Reply, those stations cancel their LNRQ packets.

Figure 5:
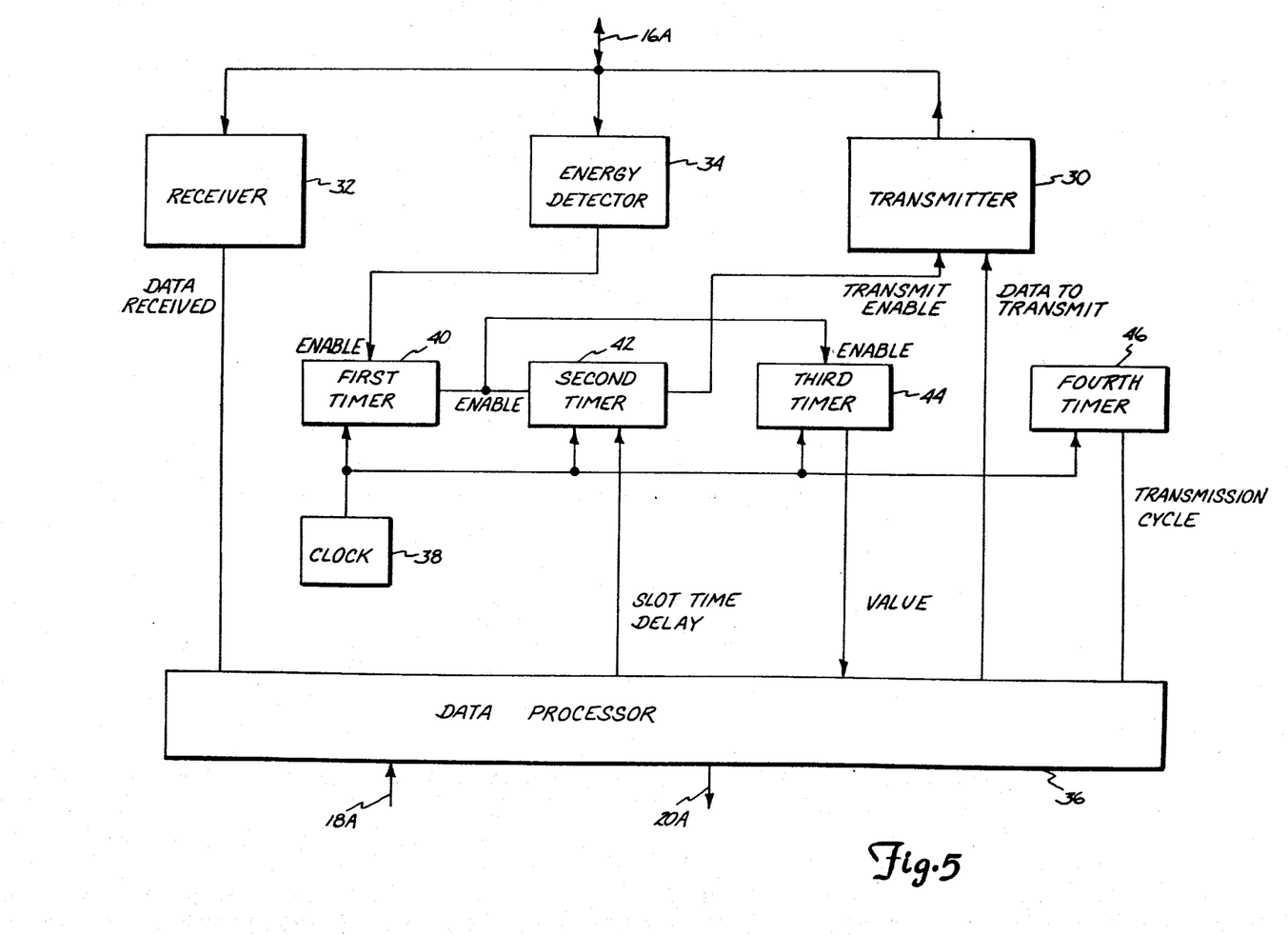
FIG. 5 is an electrical block diagram of a typical station of the system FIG. 1.

FIG. 5 shows a block diagram of station 12A, which is generally typical of each of the stations 12A-12D of system 10. In this embodiment, station 12A includes transmitter 30, receiver 32, energy detector 34, data processor 36, clock 38, and first, second, third and fourth timers 40, 42, 44 and 46.

Data processor 36 receives inputs on lines 18A, provides outputs on lines 20A, and coordinates and determines the information to be transmitted in data packets on communication medium 14. In preferred embodiments, data processor 36 is a microprocessor based data processing apparatus which includes a microprocessor, related program and data storage, and input/output interface devices necessary to interface data processor 36 with the remaining devices of station 12A, as well as with lines 18A and 20A.

Receiver 32 receives and decodes data packets, and stores the received packets temporarily in a receive buffer (not shown). Receiver 32 performs error decoding functions to determine the validity of the data packet received, based upon the LRC and CRC redunduncy check fields, the Byte Count field, and the Address Complement field contained in the packet header (see FIG. 2).

The information from a valid packet is supplied by receiver 32 to data processor 36. The received data is used by data processor 36 to update the data stored and used by data processor 36, and is also used in formulating data packets which will be transmitted on communication medium 14 by transmitter 30.

Processor 36 assembles and formats the data to be transmitted by transmitter 30, and provides that data to a transmit buffer (not shown) within transmitter 30. The transmitter 30 formats the information received from data processor 36 into the proper form for transmission, and awaits a transmitter enable signal from timer 42. When enabled, transmitter 30 transmits the data packet based upon the information stored in its transmit buffer.

When the end of a transmission on communication medium 14 occurs, the output of energy (or activity) detector 34 changes state. This enables first and third timers 40 and 44, which begin counting in response to clock pulses from clock 38. First timer 40 times the Response Time Period (which in one embodiment is 700 microseconds). During this Response Time Period, receiver 32 decodes the last data packet received and provides the information to data processor 36. This information includes the address of the last station to transmit, as well as an indication of the type of packet, and whether a Priority One response is required of station 12A.

During the Response Time period, data processor 36 assembles the data which it has to transmit, determines the types of packets to be transmitted, and selects the highest priority packet for its next transmission. Based upon this determination, and the location of station 12A with respect to the last station to transmit, data processor 36 determines the time slot to which station 12A is entitled in the next transmission. For example, if the packet of highest priority is a LINK Broadcast packet, data processor 36 selects the time slot within the Priority Three slots to which station 12A is entitled. Processor 36 then loads second timer 42 with a value which will produce a time period which expires when the selected time slot is to occur. In a preferred embodiment, both first timer 40 and second timer 42 are count down timers. When first timer 40 reaches zero, the 700 microsecond response time has expired, and the output of first timer 40 enables second timer 42 to begin timing the time delay which will end with the time slot determined by data processor 36. If second timer 42 times out before another transmission is received by station 12A, it will provide a Transmit Enable signal to transmitter 30, and the data packet stored by transmitter 30 is transmitted onto communication medium 14.

Because the determination of the time delay is made by data processor 36, it is possible to provide a wide range of different allocations of time slots based upon different protocols. As discussed previously, in one preferred embodiment Priority One and Priority Two packets have absolute predetermined time slots, while Priority Three, Four and Five data packets have rotating slot allocation based upon BRAM.

If at a time before second timer 42 times out, activity is detected on communication medium 14 by energy detector 34, the energy detect signal will change state, and reset first timer 40. This removes the enable from second timer 42, and prevents second timer 42 from timing out and providing the transmit enable signal to transmitter 30.

When a transmission is detected on communication medium 14 before second timer 42 is timed out, receiver 32 again receives the transmission, decodes it, and supplies the decoded information to processor 36. When that transmission is ended, energy detector 34 again changes state, thus enabling first timer 40 to start a new Response Time period. The process is repeated with data processor 36 determining a new slot time depending upon the data packets it has to transmit and the priority of the highest priority packet, and loads second timer 42 with a new slot time delay value. This process will continue until station 12A has the shortest delay time (i.e. the earliest time slots) of all of the stations within system 10. At that time its second timer 42 will time out first and station 12A will transmit on medium 14.

Fourth timer 46 times the transmission cycle. As illustrated in FIG. 4, data processor 36 uses the transmission cycle time to divide the cycle into five subperiods. The particular types of data packets selected by data processor 36 for transmission depend upon the current subperiod of the transmission cycle.

System 10 strongly relies on the determination of a precise time interval between packets on medium 14. Variations of as little as 10 microsecond will cause packets to be transmitted in the wrong slot, possibly causing packet collisions, or undesired alterations in transmission priority. Any station with a faster or slower clock 38 will determine a wrong time slot for placing a packet on communication medium 14. For example, if clock 38 of station 12A is running faster than any of the other clocks in system 10, timer 40 and timer 42 will time out faster than they should, and therefore transmitter 30 will receive an Transmit Enable signal earlier than it should. This can cause the time slots of two stations to overlap.

The security of system 10 in passing access is enhanced by each station 12A-12D determining the correctness of its own clock by comparing the time slots which it determines with the time slots as determined by the station that transmitted the data packet which has just been received.

In system 10, all stations 12A-12D are aware of the address of the last station to transmit because the Last Address is contained in the header of each data packet. In addition, all stations 12A-12D are aware of the address of the current station that transmitted, because the Current Address is also contained in the packet header. Finally, all stations know the particular type of data packet which has been sent, because it is identified in the packet header.

With this information, each station 12A-12D can compute the time slot which it would have predicted for the data packet just transmitted (since all stations 12A-12D use the same rules for determining slot times) and can then compare that with the actual time slot. If a station repeatedly disagrees with other stations as to the location of the time slot for transmission, that station concludes that its clock is incorrect and simply drops out of the transmission rotation.

In the preferred embodiment shown in FIG. 5, the slot error detection described above is achieved using third timer 44 to time the period from the end of one data packet until the beginning of the next data packet. Third timer 44 is enabled when first timer 40 times out. Third timer 44 continues to count in response to clock pulses from clock 38 until energy is detected again on communication medium 14. The value contained in third timer 44 when energy detector 34 again changes its output represents the time from the end of one data packet to the beginning of the next.

Receiver 32 decodes the new data packet and provides processor 36 with the information indicating the last address, the current address, and the message type. From that information, processor 36 determines what the value from third timer 44 should have been if clock 38 is in agreement with the clock of the transmitting station. If the comparison between this derived value and the value from third timer 44 differ by greater than a predetermined amount, data processor 36 notes a slot time error. These slot time errors are monitored, and if slot time errors occur from transmissions by more than one station, processor 36 concludes that clock 38 is in error and will stop transmitting over communication medium 14. In this way, therefore, the stations in effect "vote" on whose clock is accurate. If more than one station tell data processor 36 (through a slot time error) that clock 38 is in error, processor 36 considers clock 38 to have been outvoted by the other stations, and discontinues transmission.

In another embodiment, the need to calculate a predicted time delay value is eliminated by including in the header information of each data packet the time delay value used by the transmitting station. This time delay value is decoded by receiver 32 and is compared by data processor 36 to the time value from third timer 44.

In conclusion, the system of the present invention provides highly efficient communication of data among distributed stations within a distributed process control or data processing system. Minimum time delays are used, while ensuring that the most important packets are always transmitted before those of lower priority.

Although the present invention has been described with reference to preferred embodiments, workers skilled in the art will recognize that changes may be made in form and detail without departing from the spirit and scope of the invention.

What is claimed is:

1. A system for allocating use of a common communication medium for carrying packets of information of different priorities among a plurality of stations, each station comprising:
   receiver means coupled to the communication medium for receiving packets transmitted by other stations;
   detection means coupled to the communication medium for detecting activity on the communication medium and providing a detect signal which indicates a beginning and end of each packet;
   transmitter means coupled to the communication medium for transmitting a packet onto the communication medium responsive to a transmit enable signal;
   packet selecting means for selecting a packet to be transmitted as a function of the priorities of the packets available for transmission by the station;
   time slot selecting means for selecting a time slot as a function of the priority of the packet to be transmitted by the station; and
   timer means responsive to the detect signal for providing the transmit enable signal to the transmitter means if the selected time slot occurs before the detect signal indicates a beginning of a new packet.

2. The system of claim 1 wherein each priority has a different set of time slots which are spaced in time from the end of a last packet depending upon the priority, and wherein the time slot selecting means selects the time slot from the set corresponding to the priority of the packet to be transmitted.

3. The system of claim 2 wherein the sets of time slots are spaced in time from the end of the last packet with the set corresponding to a highest priority closest to the end of the last packet and the set corresponding to a lowest priority furthest from the end of the last packet.

4. The system of claim 2 wherein one of the priorities has a set with a different time slot for each station, and wherein the slot time selecting means selects the slot time from that set according to a predetermined protocol shared by all stations.

5. The system of claim 4 wherein the predetermined protocol is a rotation queue in which a last-to-transmit station is assigned a last time slot of the set.

6. The system of claim 2 wherein the packets include a first priority type packet having a first priority and a second priority less than the first priority.

7. A system for allocating use of a common communication medium for carrying packets of information of different priorities among a plurality of stations, each station comprising:
   receiver means coupled to the communication medium for receiving packets transmitted onto the communication medium;
   detection means coupled to the communication medium for detecting activity on the communication medium and providing a detect signal as a function of the activity;
   transmitter means coupled to the communication medium for transmitting a packet onto the communication medium responsive to a transmit enable signal;
   packet selecting means for selecting a packet to be transmitted as a function of the priorities of the packets available for transmission by the station; and
   timer means responsive to the detect signal for providing the transmit enable signal to the transmitter means as a function of the priority of the packet to be transmitted by the station.

8. The system of claim 7 and further comprising:
   time slot selecting means for selecting a time slot for initiation of transmission of a packet as a function of the priority of the packet.

9. The system of claim 8 wherein each priority has a different set of time slots which are spaced in time from the end of the last packet depending upon the priority of the packet to be transmitted.

10. The system of claim 9 wherein the time slot selecting means selects the time slot from the set corresponding to the priority of the packet to be transmitted.

11. The system of claim 7 wherein the packets include a first priority type packet having a first priority and a second priority packet having a second priority less than the first priority.

12. The system of claim 11 wherein first priority type packets are enabled for transmission in accordance with a first access protocol.

13. The system of claim 12 wherein the first access protocol comprises a fixed slot of time for initiation of transmission of first priority type packets during such fixed slot of time.

14. The system of claim 11 wherein second priority type packets are enabled for transmission in accordance with a second access protocol.

15. The system of claim 14 wherein the second access protocol is a rotation queue in which a last-to-transmit station is assigned a last time slot in the rotation queue.

16. The system of claim 14 wherein the second access protocol provides a random time after first priority packets before second priority packets are enabled for transmission.

17. A system for allocating use of a common communication medium for carrying packets of information of different priorities among a plurality of stations each of which is capable of transmitting packets of different priorities, each station comprising:
   receiver means coupled to the communication medium for receiving packets transmitted onto the communication medium;
   detection means coupled to the communication medium for detecting activity on the communication medium and providing a detect signal as a function of the activity;
   transmitter means coupled to the communication medium for transmitting a packet onto the communication medium responsive to a transmit enable signal;
   time slot selecting means for selecting, as a function of the priority of a packet to be transmitted, a time slot for initiation of transmission of the packet from among a plurality of time slots spaced at different times from an end of activity detected by the detection means; and
   timer means responsive to the detect signal for providing the transmit enable signal to the transmitter means if the time slot selected as a function of the priority of the packet to be transmitted by the station occurs before activity is detected.

18. The system of claim 17 and further comprising:

packet selecting means for selecting the packet to be transmitted as a function of the priorities of the packets available for transmission by the station.

19. A system for allocating use of a common communication medium for carrying packets of information among a plurality of stations, each of which is capable of transmitting a first priority type packet having a first priority and a second priority type packet having a second priority which is less than the first priority, each station comprising:

receiver means coupled to the communication medium for receiving packets transmitted onto the communication medium;

detection means coupled to the communication medium for detecting activity on the communication medium and providing a detect signal as a function of the activity;

transmitter means coupled to the communication medium for transmitting a packet onto the communication medium responsive to a transmit enable signal; and means responsive to the detect signal for providing the transmit enable signal to the transmitter means based upon a first access protocol when the packet to be transmitted by the station is a first priority type packet and based upon a second access protocol when the packet to be transmitted by the station is a second priority type packet.

20. The system of claim 19 wherein the first access protocol comprises a fixed slot of time for initiation of transmission of first priority type packets during such fixed slot of time.

21. The system of claim 19 wherein the second access protocol is a rotation queue in which a last-to-transmit station is assigned a last time slot in the rotation queue.

22. The system of claim 19 wherein the second access protocol provides a random time after first priority packets before second priority packets are enabled for transmission.

* * * * *